(12) United States Patent
Wilson et al.

(10) Patent No.: US 11,446,800 B2
(45) Date of Patent: Sep. 20, 2022

(54) CLUTCH PACK PRE-BUILD FIXTURE AND INSTALLATION TOOL

(71) Applicant: Ford Global Technologies, LLC, Dearborn, MI (US)

(72) Inventors: Brandon Paul Wilson, Allen Park, MI (US); Zachary James Kadykowski, Chelsea, MI (US); Nabil Ajami, Dearborn Heights, MI (US); Zachary Alan Westhoff, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/465,009

(22) Filed: Sep. 2, 2021

(65) Prior Publication Data

US 2021/0394345 A1    Dec. 23, 2021

Related U.S. Application Data

(63) Continuation of application No. 16/675,871, filed on Nov. 6, 2019, now Pat. No. 11,148,265.

(51) Int. Cl.
*B25B 27/00* (2006.01)
*F16D 13/60* (2006.01)
*F16D 13/64* (2006.01)

(52) U.S. Cl.
CPC .......... *B25B 27/0064* (2013.01); *F16D 13/60* (2013.01); *F16D 13/648* (2013.01); *F16D 2250/0084* (2013.01); *F16D 2300/12* (2013.01)

(58) Field of Classification Search
CPC ..... B25B 27/0064; B25B 27/14; B25B 11/02; Y10T 29/53926; Y10T 29/49895;
(Continued)

(56) References Cited

U.S. PATENT DOCUMENTS 3,686,739 A * 8/1972 Manero ................... F16D 13/00
269/1
4,564,994 A * 1/1986 Marx ..................... B23P 19/002
269/47

(Continued)

FOREIGN PATENT DOCUMENTS

| DE | 3609376 A1 * | 9/1987 | ......... B25B 27/0064 |
| DE | 102013223590 A1 * | 7/2014 | ............. B25B 11/02 |
| DE | 102014206972 A1 * | 10/2015 | ........... F16D 13/683 |

*Primary Examiner* — Matthew P Travers
(74) *Attorney, Agent, or Firm* — Burris Law, PLLC

(57) ABSTRACT

A method and tool system coaxially orients inner clutch plates with outer clutch plates on a tool. The tool includes a plurality of guide members circumferentially spaced apart, each guide member matingly engages a toothed portion of each inner clutch plate to position the inner clutch plates coaxially. A pre-build fixture includes a plurality of alignment pillars, at least one support block, and an alignment member. The alignment pillars are circumferentially spaced apart about a fixture axis. Each alignment pillar has a curved inner face that faces radially inward and has an arclength that is configured to coincide with and fit within a corresponding gap between radially outward facing teeth of each outer clutch plate. The support block supports the tool coaxially with the fixture. The alignment member engages the tool to inhibit rotation of the tool when the tool is supported coaxially with the fixture by the support block.

20 Claims, 7 Drawing Sheets

(58) Field of Classification Search
CPC ......... Y10T 29/49901; Y10T 29/49902; Y10T 29/49998; B23P 19/04; B23P 19/10; F16D 2250/0084; F16D 2300/12
See application file for complete search history.

(56) References Cited

U.S. PATENT DOCUMENTS

| | | | | |
|---|---|---|---|---|
| 5,104,162 A | * | 4/1992 | Watanabe | F16D 13/683 29/274 |
| 5,197,181 A | * | 3/1993 | Abe | H02K 5/00 29/467 |
| 2002/0152602 A1 | * | 10/2002 | Relan | F16D 13/683 29/464 |
| 2009/0179367 A1 | * | 7/2009 | Loscher | F16D 13/683 29/274 |

* cited by examiner

CLUTCH PACK PRE-BUILD FIXTURE AND INSTALLATION TOOL

CROSS-REFERENCE TO RELATED APPLICATION

This application is a continuation of and claims the benefit of U.S. application Ser. No. 16/675,871, filed Nov. 6, 2019, and titled "CLUTCH PACK PRE-BUILD FIXTURE AND INSTALLATION TOOL," the content of which is incorporated herein by reference in its entirety.

FIELD

The present disclosure relates to a clutch pack pre-build fixture and installation tool.

BACKGROUND

The statements in this section merely provide background information related to the present disclosure and may not constitute prior art.

Some transmissions and driveline components include a clutch. A clutch pack of the clutch typically includes inner clutch plates that alternate between outer clutch plates, with springs that bias the plates axially apart. The inner clutch plates have splines or teeth that face radially inward to slidingly engage an inner clutch hub. The outer clutch plates have spines or teeth that face radially outward to slidingly engage a clutch housing or clutch basket. The clutch plates and springs must be rotationally oriented to align with the teeth of their mating components and then stacked into the housing of the clutch assembly. Aligning the plates manually as they are placed into the housing can be time consuming. Traditional equipment or fixtures that stack these clutch packs are expensive, require considerable maintenance, and do not produce enough stacks to support high volume production lines. Traditional stacking equipment also typically requires one operator to manually unload the stacks and place them on a separate feed system for a different operator to install into the clutch housing.

The present disclosure addresses these and other issues associated with clutch pack assembly.

SUMMARY

This section provides a general summary of the disclosure and is not a comprehensive disclosure of its full scope or all of its features.

In one form, a tool for assembling components of a clutch pack coaxially about an axis includes a base, a first guide member, and a second guide member. The first guide member is coupled to the base and has a first guide face configured to matingly engage a toothed portion of an inner clutch plate of the clutch pack. A top portion of the first guide face is radially inward of a bottom portion of the first guide face. A second guide member is coupled to the base and spaced apart from the first guide member. The second guide member has a second guide face configured to matingly engage the toothed portion of the inner clutch plate of the clutch pack. A top portion of the second guide face is radially inward of a bottom portion of the second guide face. According to a variety of alternate forms: the tool further includes at least one finger movable between an extended position and a retracted position, wherein in the extended position the at least one finger supports the components of the clutch pack about the first and second guide members, wherein in the retracted position the components of the clutch pack are permitted to fall from a bottom of the tool; the tool further includes a release member movable between a first position and a second position relative to the base, wherein in the first position the release member holds the at least one finger in the extended position, and wherein in the second position the release member permits the finger to move to the retracted position; the release member is a counter weight supported for axial translation between the first position and the second position, wherein gravity biases the counterweight toward the first position in which the counter weight holds the at least one finger in the extended position, wherein the at least one finger is pivotably coupled to the base and configured to rotate from the extended position to the retracted position when the components are supported by the at least one finger and the counter weight moves from the first position to the second position; the release member is biased toward the first position and the release member includes a push lug extending axially below the base and configured to engage a portion of a clutch housing to push the release member to the second position when the tool is lowered into the clutch housing; the tool includes a handle coupling upper portions of the first and second guide members; the tool further includes a third guide member coupled to the base and spaced circumferentially apart from the first and second guide members, the third guide member having a third guide face configured to matingly engage the toothed portion of the inner clutch plate of the clutch pack, a top portion of the third guide face is radially inward of a bottom portion of the third guide face; the first and second guide members are formed of a low density or hollow metal material and the base is formed of a composite material or a plastic material; the first and second guide members are removably connected to the base; the first guide face defines a shape that arcs radially outward from a top of first guide member to a bottom of the first guide member and the second guide face defines a shape that arcs radially outward from the top of second guide member to a bottom of the second guide member; the base includes a detent facing radially outward and configured to engage a mating feature in a clutch housing to align the tool within the clutch housing; the base includes a locating feature configured to engage with a mating feature of a holding fixture to orient the tool in a predetermined orientation relative to the holding fixture.

In another form, a tool for assembling components of a clutch pack coaxially about an axis includes a base, a first guide member, a second guide member, and a release mechanism. The first guide member is coupled to the base and has a first guide face configured to matingly engage a toothed portion of an inner clutch plate of the clutch pack. The first guide face defines a shape that arcs radially outward from a top of first guide member to a bottom of the first guide member. The second guide member is coupled to the base and spaced apart from the first guide member. The second guide member has a second guide face configured to matingly engage the toothed portion of the inner clutch plate of the clutch pack. The second guide face defines a shape that arcs radially outward from a top of second guide member to a bottom of the second guide member. The release mechanism is configured to support the components of the clutch pack about the first and second guide members when the tool is in a first position relative to a housing of a clutch and to release the components of the clutch pack into the housing when the tool is in a second position relative to the housing. According to a variety of alternate forms: the tool further includes a handle coupling top portions of the first and second guide members; the base defines a lower ring coupling bottom portions of the first and second guide members; the first and second guide members removably attached to the base; the base includes at least one detent configured to engage a clutch housing when the tool is in a predetermined orientation relative to the housing; the release mechanism includes a plurality of fingers and a counter weight, the fingers being coupled to the base and configured to pivot relative to the base between an extended position and a retracted position, wherein in the extended position the fingers support the components of the clutch pack about the first and second guide members, wherein in the retracted position the components of the clutch pack are permitted to fall from a bottom of the tool, and wherein gravity biases the counterweight toward a first position in which the counter weight holds the fingers in the extended position.

In yet a further form, a method of assembling a clutch includes loading the clutch pack tool with components of a clutch pack, positioning the loaded clutch pack tool within a housing of a clutch, and releasing the components of the clutch pack from the clutch pack tool into the housing of the clutch by lowering the clutch pack tool until a release mechanism of the clutch pack tool engages the housing and permits the components to fall from a bottom of the clutch pack tool into the housing. According to an alternate form: the release mechanism includes a plurality of fingers and a counter weight, the counter weight movable between a first position and a second position, wherein in the first position the counter weight holds the fingers in an extended position in which the fingers support the components of the clutch pack, wherein in the second position the fingers are permitted to move to a retracted position in which the components of the clutch pack are free to fall from the clutch pack tool, wherein gravity biases the counter weight toward the first position and a portion of the counter weight is configured to engage the housing such that lowering the clutch pack tool into the housing moves the counter weight from the first position to the second position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
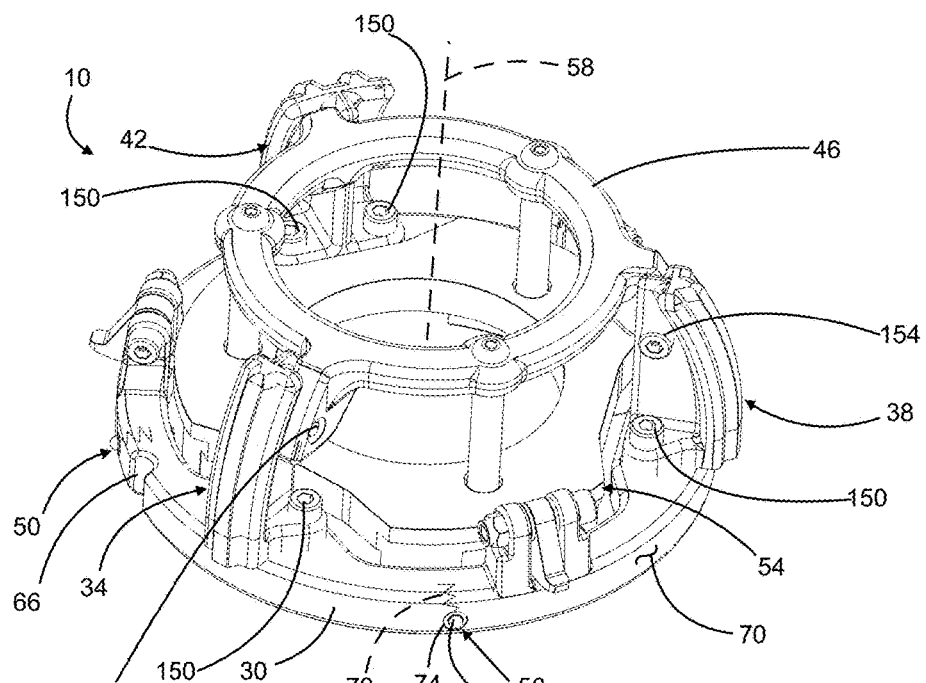
FIG. 1 is a top perspective view of a clutch pack tool in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
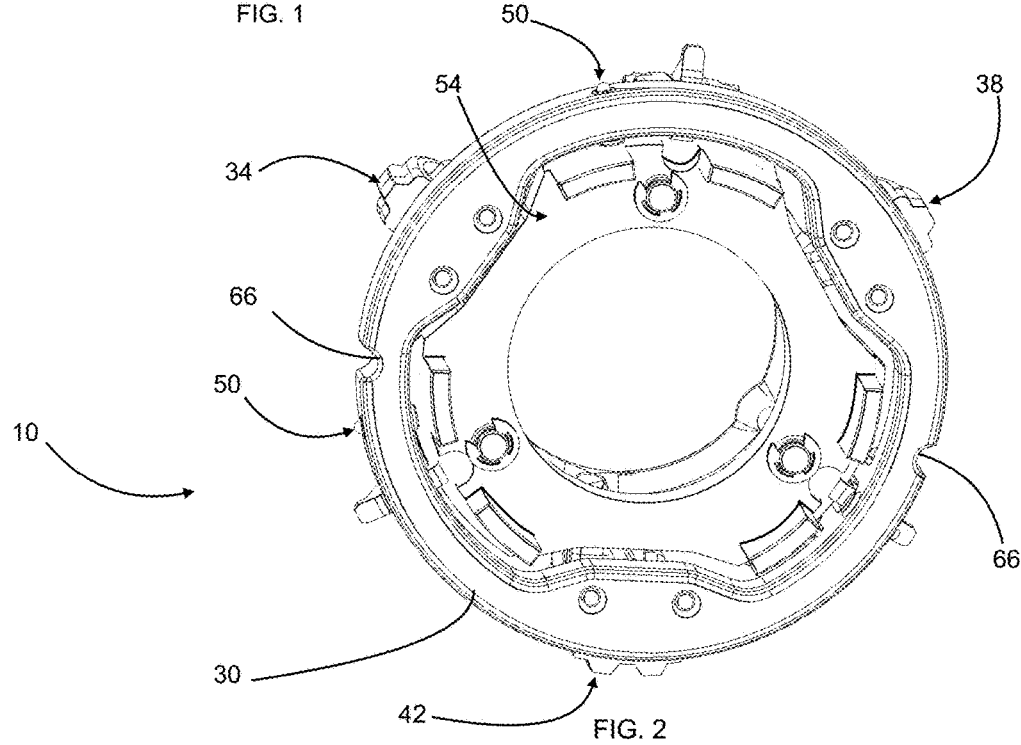
FIG. 2 is a bottom perspective view of the clutch pack tool of FIG. 1.
Figure 3:
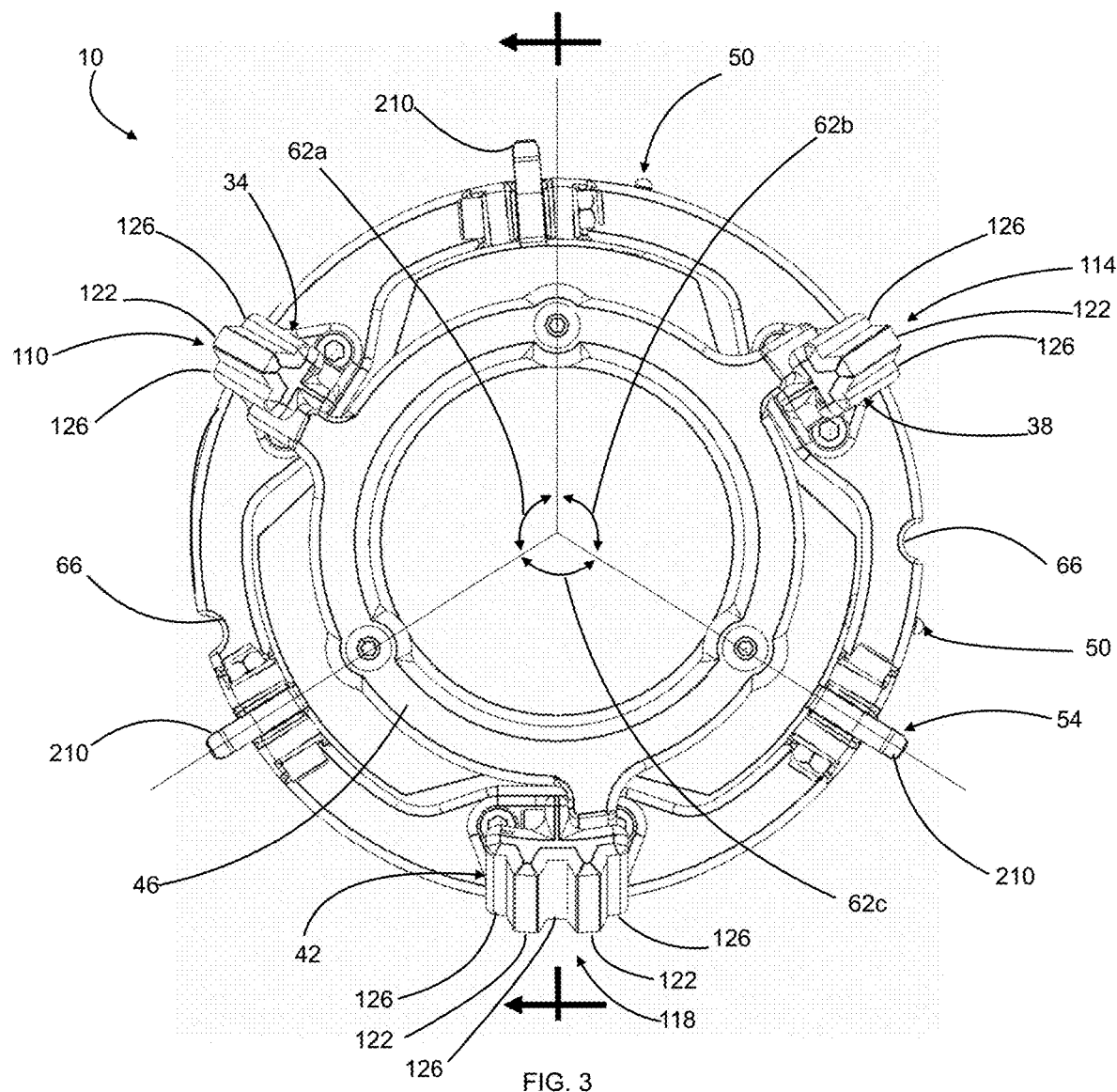
FIG. 3 is a top view of the clutch pack tool of FIG. 1.
Figure 6:
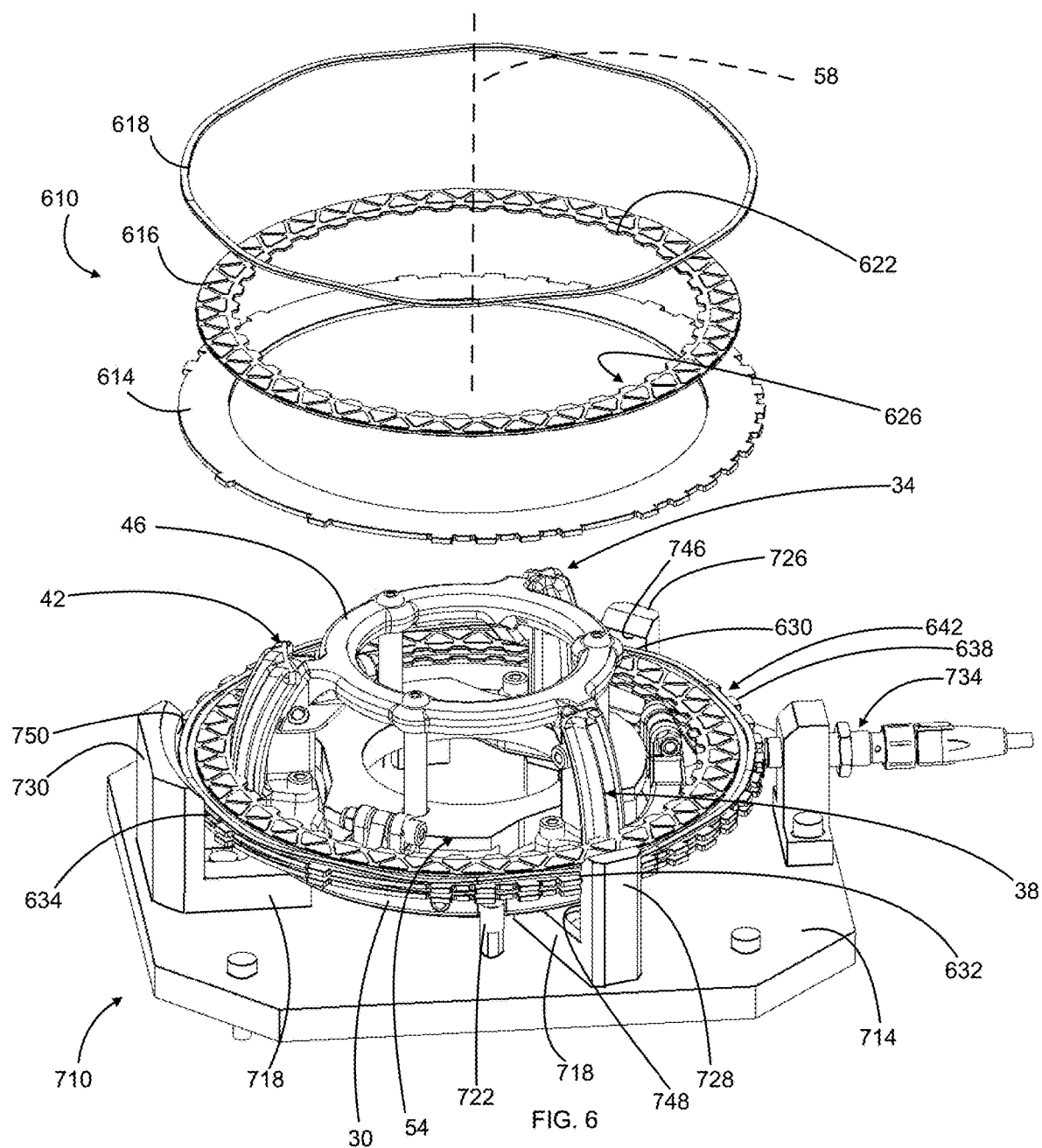
FIG. 6 is a perspective view of the clutch pack tool of FIG. 1 positioned on a pre-build fixture in accordance with the teachings of the present disclosure, illustrating components of a clutch pack in a pre-build state.

Referring to FIGS. 1-3, a clutch pack tool 10 is illustrated. Referring to FIG. 6, the clutch pack tool 10 is configured to be used to stack components of a clutch pack 610 including outer clutch plates 614, inner clutch plates 616, and clutch springs 618. The outer and inner clutch plates 614, 616 are also referred to herein as inner and outer clutch rings, respectively. Returning to FIGS. 1-3, the clutch pack tool 10 includes a base 30, a first guide member 34, a second guide member 38, and a third guide member 42. In the example provided, the clutch pack tool 10 also includes a handle 46, one or more detents 50 and a release mechanism 54. The base 30 generally couples the guide members 34, 38, 42 together in fixed positions relative to a central axis 58 of the base 30. In the example provided, the guide members 34, 38, 42 are spaced apart in a circumferential direction about the axis 58 such that each guide member 34, 38, 42 is disposed within a corresponding third (e.g., region 62a, 62b, or 62c, shown in FIG. 3) of the clutch pack tool 10. While three guide members are included in the example provided, other configurations can be used. In one alternative configuration, not specifically shown, the clutch pack tool 10 only includes two guide members, which are diametrically opposite each other. In another alternative configuration, not shown, the clutch pack tool 10 includes more than three guide members spaced apart about the axis 58.

In the example provided, the base 30 defines a complete ring about the axis 58. In an alternative form, not specifically shown, the base 30 can have a gap such that the base 30 does not define a complete ring and instead defines a "C" or "U" shape about the axis 58. Returning to the example provided, the base 30 can be formed of a durable, light weight material, such as plastic or a composite material (e.g., carbon filled nylon), among others, and can be solid or hollow. The base 30 can be formed using any suitable process such as being machined, 3D printed, and/or molded for example.

The base 30 may optionally include one or more locating notches 66. In the example provided, the locating notches 66 are formed in an outer surface 70 (FIG. 1) of the base 30, though other configurations can be used. The locating notches 66 are spaced apart in the circumferential direction about the axis 58. In the example provided, the base 30 also defines a plurality of detent bores 74 (FIG. 1), within which a portion of each detent 50 is disposed. In the example provided, the detents 50 include a spring 78 (shown in dashed lines in FIG. 1) and a detent member 82 (e.g., a ball or pin). The spring 78 is disposed within the base 30 and biases the detent member 82 radially outward such that the detent member 82 extends beyond the outer surface 70 of the base 30, but may be pushed radially inward against the force of the spring 78 to a retracted position (e.g., flush with the outer surface 70).

Referring to FIG. 3, each guide member 34, 38, 42 has a guide face 110, 114, 118, respectively, that faces generally radially outward and is configured to matingly engage teeth 622 of a toothed portion 626 (FIG. 6) of the inner clutch plates 616 (FIG. 6). Each guide face 110, 114, 118 includes at least one ridge 122 and can include a corresponding trough 126, with the ridge 122 extending radially outward of the trough 126. In the example provided, each of the first and second guide faces 110, 114 includes one ridge 122 and a trough 126 on each side of that ridge 122, though other configurations can be used. In the example provided, the third guide face 118 includes two ridges 122 with each ridge 122 flanked on opposite sides by a trough 126 such that the two ridges 122 are spaced apart by a common trough 126, though other configurations can be used.

Figure 4:
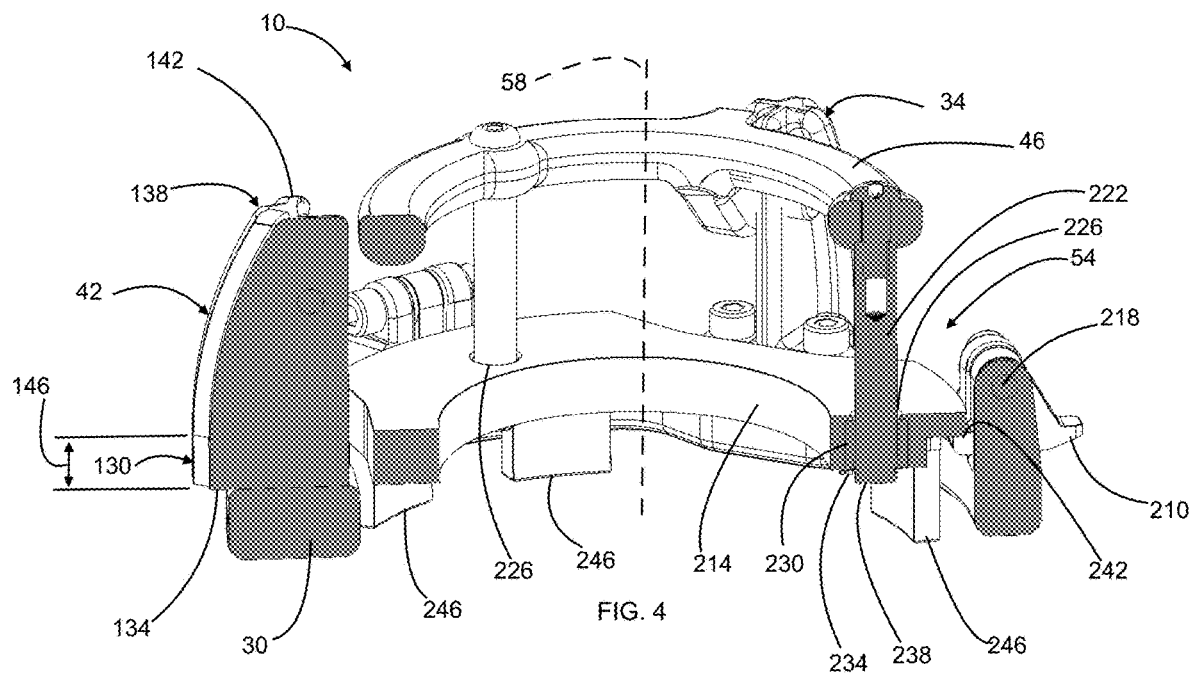
FIG. 4 is a cross-sectional perspective view of the clutch pack tool of FIG. 1.

Referring to FIG. 4, each guide face 110, 114, 118 (only guide face 118 is shown in FIG. 4) has a bottom portion 130 proximate to a bottom 134 of the guide member 34, 38, 42 and a top portion 138 proximate to a top 142 of the guide member 34, 38, 42. The top portion 138 is radially inward of the bottom portion 130 such that the guide members 34, 38, 42 taper radially inward from the bottom portion 130 to the top portion 138. In the example provided, each guide face 110, 114, 118 curves or arcs radially outward from the top 142 of the first guide member 34 (e.g., at the top portion 138) to the bottom portion 130. In the example provided, the bottom portion 130 has a generally constant diameter for an axial distance 146 before reaching the bottom 134 of the guide member 34, 38, 42.

Returning to FIGS. 1-3, each guide member 34, 38, 42 can be removably mounted to the base 30. In the example provided, the guide members 34, 38, 42 are attached to the base 30 via fasteners 150 (e.g., screws or bolts) such that the guide members 34, 38, 42 can be individually replaced. In at least one variation of the present disclosure, the guide members 34, 38, 42 are formed of a lightweight material. In the example provided, the guide members 34, 38, 42 are a different material than the base 30 such as a low density or hollow metal material. The guide members 34, 38, 42 can be formed using any suitable method. In the example provided, the guide members 34, 38, 42 are formed using a metal additive manufacturing process (e.g., 3D printing).

The handle 46 is removably mounted to at least two of the guide members 34, 38, 42 and is configured to be easily gripped from above by an operator (not shown, e.g., a person or a robotic arm). In the example provided, the handle 46 extends in an arcuate or ring shape about the axis 58 and is connected to each guide member 34, 38, 42 proximate to the top 142 (FIG. 4) of each guide member 34, 38, 42 by fasteners 154 (e.g., bolts or screws). In an alternative configuration, not shown, the handle 46 can have a gap such that the handle 46 does not define a complete ring and instead defines a "C" or "U" shape about the axis 58. Returning to the example provided, the handle 46 can be formed of a durable, light weight material, such as plastic or a composite material (e.g., carbon filled nylon), and can be solid or hollow. The handle 46 can be formed using any suitable process such as being machined, 3D printed, and/or molded for example.

Referring to FIGS. 4-7, the release mechanism 54 is configured to be operable in a first condition in which the release mechanism 54 supports the clutch pack 610 coaxially about the axis 58 and about the bottom portion 130 of the guide members 34, 38, 42. The release mechanism can be switched to a second operable condition which permits the clutch pack 610 to fall from (i.e., slide down or otherwise move below or beyond) the bottom 134 of the guide members 34, 38, 42, as described in greater detail below.

The release mechanism 54 includes a plurality of fingers 210 and a release member 214. The fingers 210 are movable relative to the base 30 between an extended position (e.g., shown in FIGS. 3-4) and a retracted position (e.g., shown in FIG. 5). In the extended position, the fingers 210 extend radially outward further than when in the retracted position to support the clutch pack 610. In the retracted position, the fingers 210 are retracted inward of the clutch pack 610 such that the clutch pack 610 is free to move downward (e.g., −z direction shown in FIG. 5) from the fingers 210 and drop from the bottom of the clutch pack tool 10. Referring to FIG. 3, the release mechanism 54 includes three fingers 210 circumferentially spaced about the axis 58 and positioned between adjacent ones of the guide members 34, 38, 42, though other configurations and numbers of fingers 210 can be used. Returning to FIGS. 4 and 5, each finger 210 is pivotably coupled to the base 30 to rotate about a pin 218 (e.g., a bolt) between the extended position and the retracted position.

The release member 214 is configured to move the fingers 210, or to permit the fingers 210 to move, between the extended position and the retracted position. In the example provided, the release mechanism 54 includes a plurality of slide posts 222 and the release member 214 is a counterweight disposed about the axis 58 and supported by the slide posts 222. Accordingly, the release member 214 is also referred to herein as the counterweight 214. In the example provided, the counterweight 214 is an annular body. In an alternative configuration, not shown, the counterweight 214 can have a gap such that the release member 214 does not define a complete ring and instead defines a "C" or "U" shape about the axis 58.

The slide posts 222 are circumferentially spaced about the axis 58 and extend longitudinally parallel to the axis 58. In the example provided, the slide posts 222 are fixedly coupled to the handle 46 and extend below the handle 46. In the example provided, the slide posts 222 hang freely from the handle 46 and are located radially inward of the base 30. Each slide post 222 extends axially through a corresponding aperture 226 in the counterweight 214 such that the counterweight 214 can translate axially along the slide posts 222 between a first position (shown in FIG. 4) and a second position (shown in FIG. 5). In the example provided, a bearing 230 is disposed between the counter weight 214 and each slide post 222 and a stop member 234 (e.g., a c-ring, a pin, or a protrusion) is disposed at a bottom 238 of each slide post 222 to inhibit the counter weight 214 from falling off the slide posts 222.

The counterweight 214 is configured to engage the finger 210, such as at a shoulder 242 on a radially inward side of the finger 210, to hold the finger 210 in the extended position when the counterweight 214 is in the first position. When the counterweight 214 is in the second position, the finger 210 is free to pivot to the retracted position. The counterweight 214 can also include one or more push lugs 246 extending from the bottom of the counterweight 214. In the example provided, the push lugs 246 are circumferentially spaced apart and extend below the base 30 when the counterweight 214 is in the second position, though other configurations can be used.

Figure 7:
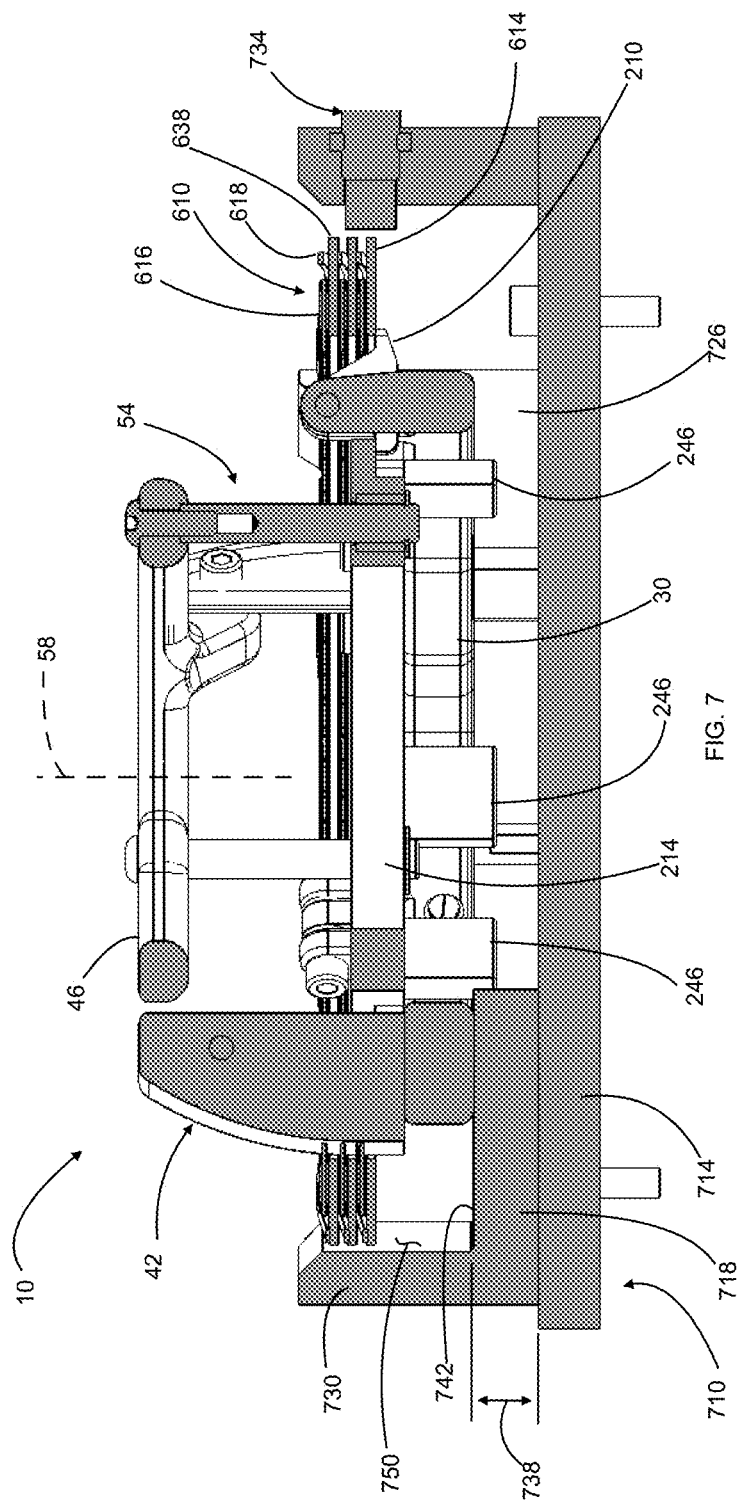
FIG. 7 is a cross-sectional view of the clutch pack tool of FIG. 1 on the pre-build fixture of FIG. 6.

Referring to FIGS. 6 and 7, the clutch pack tool 10 can be supported on a pre-build fixture 710. The pre-build fixture 710 includes a fixture base 714, a plurality of support blocks 718, one or more tool alignment members 722, and one or more alignment pillars (e.g., alignment pillars 726, 728, 730). In the example provided, the pre-build fixture 710 also includes a sensor 734. The support blocks 718 are mounted to the fixture base 714 and have a height 738 such that when the base 30 of the clutch pack tool 10 sits on a top surface 742 of the support blocks 718, the counterweight 214 can hang down to its first position. In the example provided, the push lugs 246 extend below the top surface 742 of the support blocks 718.

The tool alignment member 722 is coupled to the fixture base 714 and extends upward therefrom. Each tool alignment member 722 is configured to mate with and engage a corresponding one of the locating notches 66 when the clutch pack tool 10 is properly rotationally aligned on the pre-build fixture 710. The locating notches 66 and tool alignment member 722 can be located such that the clutch pack tool 10 can only be positioned in one rotational orientation on the pre-build fixture 710.

In the example provided, the pre-build fixture 710 includes three alignment pillars 726, 728, 730, though other configurations can be used. The alignment pillars 726, 728, 730 extend upward from the fixture base 714 above the support blocks 718. In the example provided, the alignment pillars 726, 728, 730 are unitarily formed with the support blocks 718, though other configurations can be used. The alignment pillars 726, 728, 730 are positioned about the axis 58 at predetermined locations and each has a curved inner face 746, 748, 750 that extend along corresponding predetermined arclengths (e.g., across predetermined angles) that coincide with and fit within corresponding specific gaps 630, 632, 634 between radially outward facing teeth 638 of a toothed portion 642 of the outer clutch plates 614. In the example provided, the teeth 638 of the outer clutch plates 614 are not equally spaced about the axis 58. In the example provided, the gaps 630, 632, 634 are not equal arclengths about the axis 58. Thus, the outer clutch plates 614 can only be positioned in one predetermined rotational orientation relative to the pre-build fixture 710 when loaded onto the clutch pack tool 10.

The sensor 734 is mounted to the fixture base 714 in a predetermined location and configured to detect a correct orientation of components of the clutch pack 610. For example, the sensor 734 can be configured to detect the teeth 638 of the outer clutch plates 614 and can be any suitable type of sensor (e.g., proximity sensor, a Hall effect sensor, laser sensor, radar sensor, ultrasonic sensor, etc.).

In operation, the clutch pack tool 10 is placed on the pre-build fixture 710 such that the tool alignment member 722 fits within the locating notch 66 and the base 30 sits on the support blocks 718. The weight of the counterweight 214 maintains the counterweight 214 in the first position (FIG. 4) and the counterweight 214 presses down on the shoulder 242 of the finger 210 to maintain the finger 210 in the extended position. The clutch pack 610 is then loaded onto the clutch pack tool 10 by alternating between inner clutch plates 616 and outer clutch plates 614 with the clutch springs 618 disposed radially outward of the inner clutch plates 616 and axially between outer clutch plates 614. In the example provided, the clutch springs 618 are annular wave springs configured to bias the outer clutch plates 614 axially apart from each other.

The curved or tapered nature of the guide faces 110, 114, 118 permit the inner clutch plates 616 to slide onto the guide members 34, 38, 42 easily without the inner clutch plates needing to be perfectly coaxial with the axis 58 when first positioned. At the same time, the orientation of the guide faces 110, 114, 118 ensures that the inner clutch plates 616 are rotationally oriented correctly. The alignment pillars 726, 728, 730 ensure that the outer clutch plates 614 are rotationally oriented correctly relative to the inner clutch plates 616.

The weight of the clutch pack 610, is such that it does not overcome the weight of the counterweight 214 and the fingers 210 remain in the extended position to support the clutch pack 610 on the clutch pack tool 10. Once the clutch pack 610 is loaded, the operator (not shown) can lift the loaded clutch pack tool 10 by the handle 46.

Figure 8:
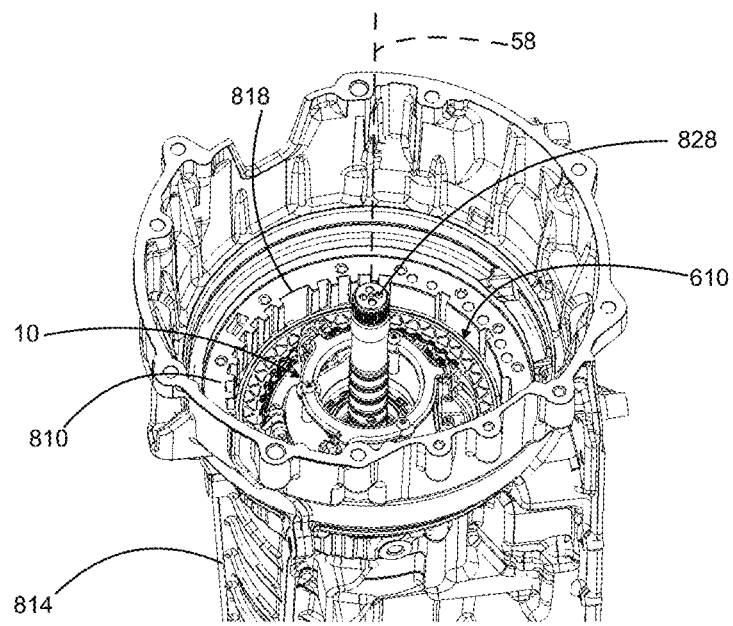
FIG. 8 is a perspective view of the clutch pack tool of FIG. 1 positioned within a portion of a transmission in accordance with the teachings of the present disclosure.
Figure 9:
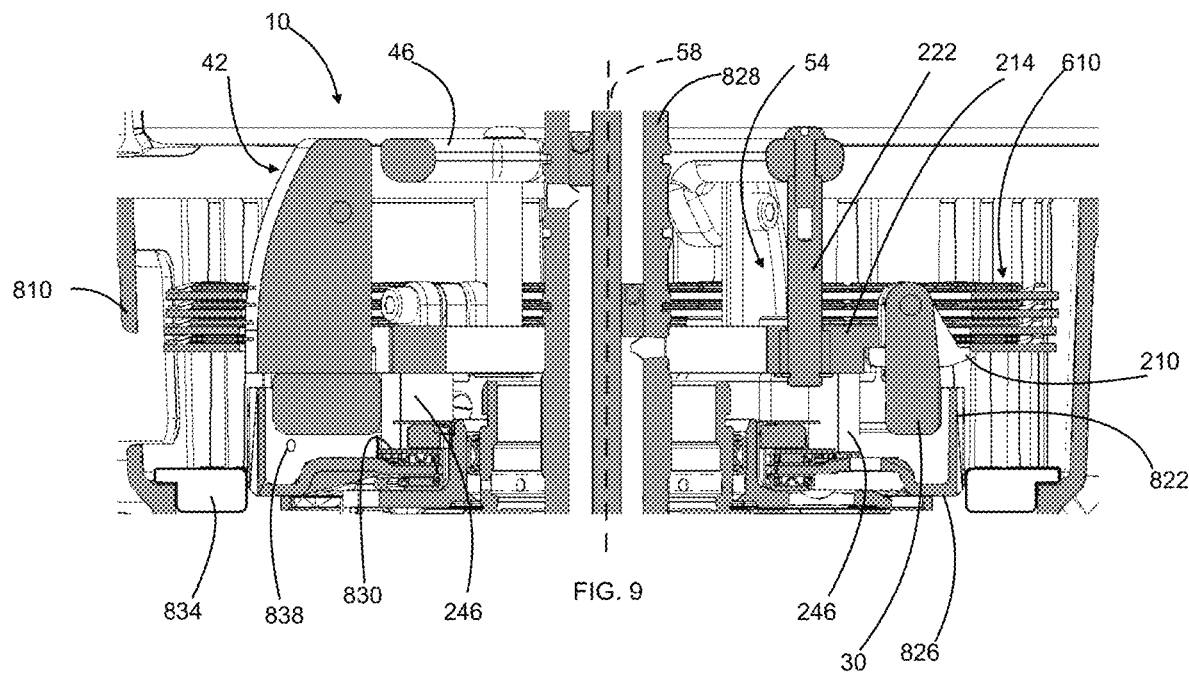
FIG. 9 is a cross-sectional view of the clutch pack tool of FIG. 1 positioned within the portion of the transmission of FIG. 8.

Referring to FIGS. 8 and 9, the operator (not shown) can transfer the loaded clutch pack tool 10 to a clutch housing 810. In the example provided, the clutch housing 810 is a portion of a transmission housing 814, though other configurations can be used. The clutch housing 810 defines a plurality of radially inward facing grooves or splines 818 that mate with the teeth 638 of the outer clutch plates 614 such that the outer clutch plates 614 can slide axially into the clutch housing 810. The teeth 622 of the inner clutch plates 616 align with outward facing grooves or splines 822 of an inner clutch hub 826 such that the inner clutch plates 616 can slide axially on the inner clutch hub 826. The annular shape of the clutch pack tool 10 can be positioned coaxially about a shaft 828 within the clutch housing 810.

Figure 5:
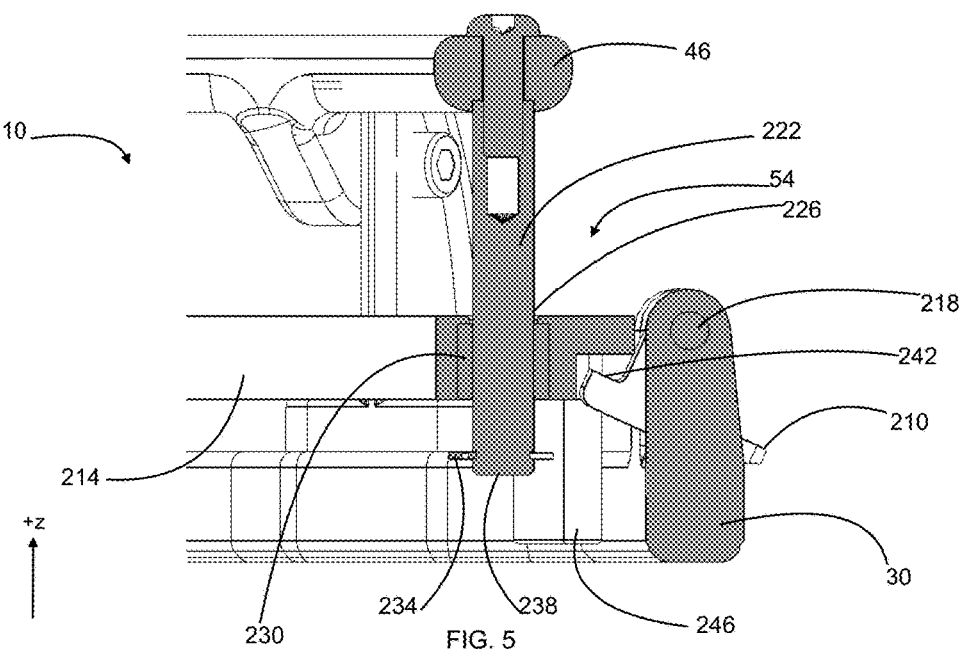
FIG. 5 is a cross-sectional view of a portion of the clutch pack tool of FIG. 1, illustrating a finger of the clutch pack tool in a retracted position in accordance with the teachings of the present disclosure.

Referring to FIG. 9, the clutch pack tool 10 is illustrated positioned such that the push lugs 246 are in contact with a component 830 within the clutch housing 810. The operator (not shown) can then press the handle 46 down, causing the base 30 to move lower relative to the counterweight 214 until the counterweight 214 is in the second position (FIG. 5). As the counterweight 214 moves to the second position, the weight of the clutch pack 610 causes the fingers 210 to pivot to the retracted position (FIG. 5). Thus, the clutch pack 610 is released and drops from the bottom of the clutch pack tool 10 into the clutch housing 810 (e.g., onto a pressure plate 834). Alternatively, the weight of the loaded clutch pack tool 10 (i.e., the components other than the counter weight 214) can be such that the operator does not need to actively apply a downward force on the handle 46 and gravity moves the clutch pack tool 10 until the counter weight 214 is in the second position.

The detents 50 (FIGS. 1-3) can snap into place in a locating feature of a component within the clutch housing 810 when the clutch pack tool 10 is fully inserted into the clutch housing 810 and properly oriented. In the example provided, the detents 50 can each snap into a corresponding oil feed hole 838 of the inner clutch hub 826, though other configurations can be used.

Figure 10:
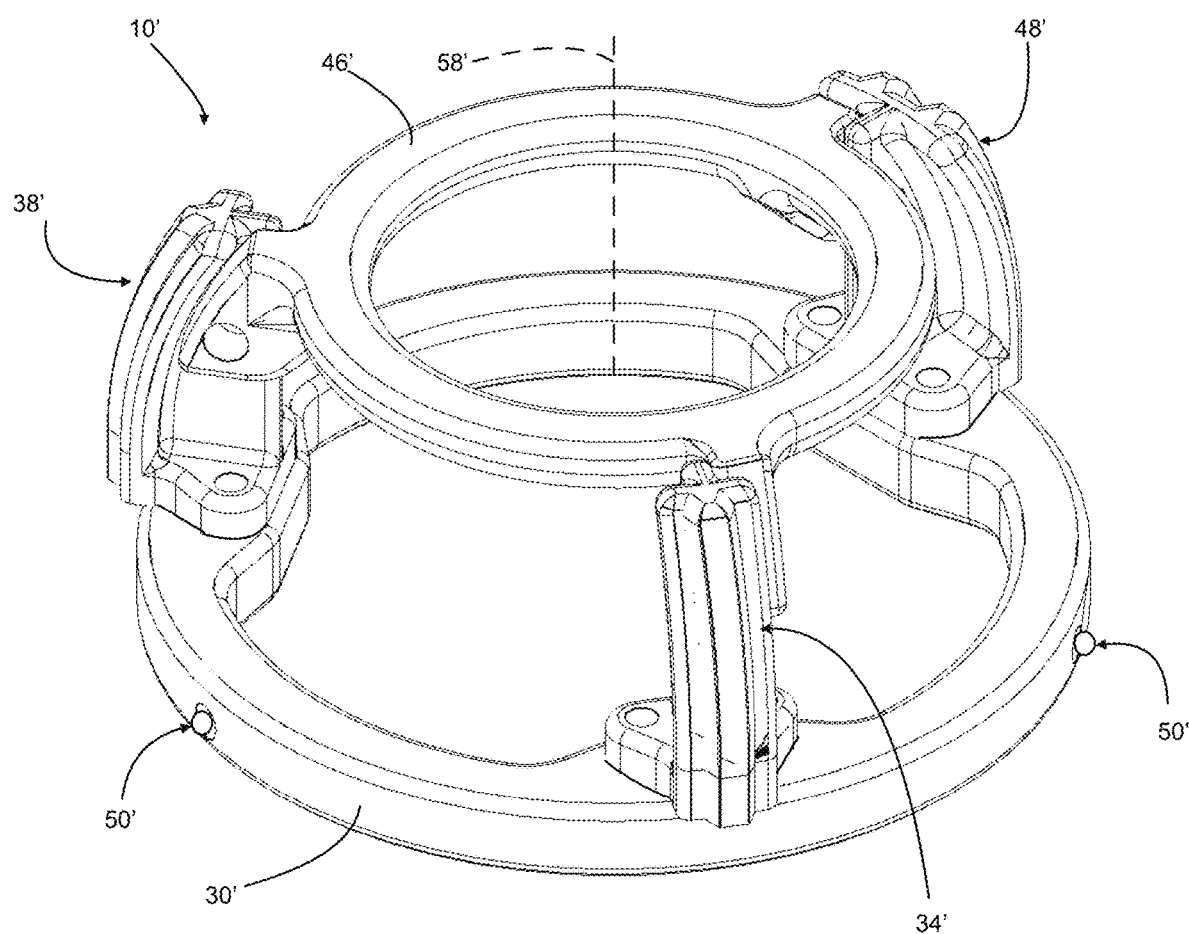
FIG. 10 is a perspective view of a clutch pack tool of a second configuration in accordance with the teachings of the present disclosure.

Referring to FIG. 10, a clutch pack tool 10' of a second construction is illustrated. The clutch pack tool 10' is similar to the clutch pack tool 10 (FIGS. 1-9) except as otherwise shown or described herein. Similar features are denoted with similar but primed reference numbers and only differences are described in detail herein. The clutch pack tool 10' does not include the release mechanism 54 (FIGS. 1-9). Instead of being pre-loaded on the pre-build fixture 710 (FIGS. 6 and 7) and then being transferred to the clutch housing 810 (FIGS. 8 and 9), the clutch pack tool 10' is positioned within the clutch housing 810 (FIGS. 8 and 9) until the detents 50' snap into place. The clutch pack 610 (FIGS. 6-9) can be pre-stacked on a separate fixture (not shown), removed from the fixture, and placed into the clutch housing 810 (FIGS. 8 and 9) onto the clutch pack tool 10'. The clutch pack tool 10' can help the operator to align the clutch pack 610 (FIGS. 6-9) within the clutch housing (FIGS. 8 and 9). The clutch pack 610 (FIGS. 6-9) then slides down the guide members 34',38',42' into the clutch housing 810 (FIGS. 8 and 9). Alternatively, the operator (not shown) can place the inner clutch plates 616, outer clutch plates 614, and clutch springs 618 (FIGS. 6-9) individually into the clutch housing 810 (FIGS. 8 and 9) onto the clutch pack tool 10'.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer, or section, could be termed a second element, component, region, layer, or section without departing from the teachings of the example forms. Furthermore, an element, component, region, layer, or section may be termed a "second" element, component, region, layer, or section, without the need for an element, component, region, layer, or section termed a "first" element, component, region, layer, or section.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tool system for coaxially orienting a plurality of inner clutch plates with a plurality of outer clutch plates of a clutch pack, the tool system comprising:
   a clutch pack tool including a plurality of guide members spaced apart in a circumferential direction about a tool axis, each guide member being configured to matingly engage a toothed portion of each inner clutch plate of the plurality of inner clutch plates to position the inner clutch plates coaxially with the tool axis; and
   a pre-build fixture comprising:
      a plurality of alignment pillars spaced apart in a circumferential direction about a fixture axis, each alignment pillar having a curved inner face that faces radially inward toward the fixture axis and has an arclength in the circumferential direction about the fixture axis that is configured to coincide with and fit within a corresponding gap between radially outward facing teeth of each outer clutch plate of the plurality of outer clutch plates;
      at least one support block configured to support the clutch pack tool coaxially with the fixture axis; and
      an alignment member configured to engage the clutch pack tool to inhibit rotation of the clutch pack tool about the fixture axis when the clutch pack tool is supported coaxially with the fixture axis by the at least one support block.

2. The tool system according to claim 1, wherein the clutch pack tool includes a release mechanism including at least one finger and a release member configured to move the at least one finger between a first position and a second position, wherein when the at least one finger is in the first position, the at least one finger supports the inner clutch plates and the outer clutch plates about the tool axis, wherein movement of the at least one finger from the first position to the second position releases the inner clutch plates and the outer clutch plates to permit the inner clutch plates and the outer clutch plates to drop from a bottom of the clutch pack tool, wherein each support block of the at least one support block has a top surface that is configured to contact and support the clutch pack tool such that the release member is positioned below the top surface.

3. The tool system according to claim 1, wherein the at least one support block includes a plurality of support blocks spaced circumferentially about the fixture axis.

4. The tool system according to claim 3, wherein each alignment pillar of the plurality of alignment pillars extends from a corresponding one of the plurality of support blocks.

5. The tool system according to claim 1, wherein the clutch pack tool defines a notch and the alignment member is configured to be received in the notch when the clutch pack tool is supported by the at least one support block coaxially with the fixture axis and in a predetermined rotational position relative to the fixture axis.

6. The tool system according to claim 1, wherein the pre-build fixture further comprises a sensor configured to detect a rotational orientation of components of the clutch pack.

7. The tool system according to claim 1, wherein the curved inner faces of the alignment pillars have different arclengths.

8. The tool system according to claim 1, wherein the pre-build fixture further comprises a base, wherein the at least one support block is coupled to the base and extends axially from the base to support the clutch pack tool above the base.

9. A tool system for coaxially orienting a plurality of inner clutch plates with a plurality of outer clutch plates of a clutch pack on a clutch pack tool, the clutch pack tool including a plurality of guide members spaced apart in a circumferential direction about a tool axis, each guide member being configured to matingly engage a toothed portion of each inner clutch plate of the plurality of inner clutch plates to position the inner clutch plates coaxially with the tool axis, the tool system comprising:
 a pre-build fixture comprising:
  a plurality of alignment pillars spaced apart in a circumferential direction about a fixture axis, each alignment pillar having a curved inner face that faces radially inward toward the fixture axis and has an arclength in the circumferential direction about the fixture axis that is configured to coincide with and fit within a corresponding gap between radially outward facing teeth of each outer clutch plate of the plurality of outer clutch plates;
  at least one support block configured to support the clutch pack tool coaxially with the fixture axis; and
  an alignment member configured to engage the clutch pack tool to inhibit rotation of the clutch pack tool about the fixture axis when the clutch pack tool is supported coaxially with the fixture axis by the at least one support block,
  wherein the curved inner face of a first one of the alignment pillars has a different arclength than the curved inner face of a second one of the alignment pillars.

10. The tool system according to claim 9, wherein the at least one support block includes a plurality of support blocks spaced circumferentially about the fixture axis.

11. The tool system according to claim 10, wherein each alignment pillar of the plurality of alignment pillars extends from a corresponding one of the plurality of support blocks.

12. The tool system according to claim 9, wherein the pre-build fixture further comprises a sensor configured to detect a rotational orientation of components of the clutch pack.

13. The tool system according to claim 9, wherein the pre-build fixture further comprises a base, wherein the at least one support block is coupled to the base and extends axially from the base to support the clutch pack tool above the base.

14. The tool system according to claim 9, further comprising the clutch pack tool.

15. The tool system according to claim 9, wherein the curved inner face of each alignment pillar is a different arclength.

16. A method of assembling a clutch, the clutch including a clutch pack including a plurality of inner clutch plates and a plurality of outer clutch plates, the method comprising:
 supporting the clutch pack tool of claim 1 coaxially on the pre-build fixture of claim 1;
 loading the clutch pack coaxially onto the clutch pack tool such that the inner face of each alignment pillar is disposed within a corresponding gap between radially outward facing teeth of each outer clutch plate of the plurality of clutch plates and a plurality of alignment faces of the clutch pack tool engage the plurality of inner clutch plates to rotationally align each inner clutch plate about the fixture axis;
 removing the loaded clutch pack tool from the pre-build fixture;
 positioning the loaded clutch pack tool within a housing of a clutch; and
 releasing the clutch pack from the clutch pack tool into the housing of the clutch.

17. The method according to claim 16, wherein releasing the clutch pack from the clutch pack tool includes lowering the clutch pack tool until a release mechanism of the clutch pack tool engages the housing and permits the clutch pack to move past a bottom of the clutch pack tool into the housing.

18. The method according to claim 17, wherein the release mechanism includes at least one finger and a counter weight, the counter weight movable between a first position and a second position, wherein in the first position the counter weight holds the at least one finger in an extended position in which the at least one finger supports the clutch pack on the clutch pack tool, wherein in the second position the at least one finger is permitted to move to a retracted position in which the clutch pack are free to fall from the clutch pack tool, wherein gravity biases the counter weight toward the first position and a portion of the counter weight is configured to engage the housing such that lowering the clutch pack tool into the housing moves the counter weight from the first position to the second position.

19. The method according to claim 18, wherein supporting the clutch pack tool coaxially on the pre-build fixture includes placing the clutch pack tool such that a base of the clutch pack tool is supported by the at least one support block and the counterweight hangs below a top surface of the at least one support block and is in the first position.

20. The method according to claim 16 further comprising detecting with a sensor a rotational alignment of at least one component of the clutch pack.

* * * * *